US012354793B2

(12) United States Patent
Morgan et al.

(10) Patent No.: US 12,354,793 B2
(45) Date of Patent: Jul. 8, 2025

(54) RADIAL MAGNETIC SWITCH

(71) Applicant: Correlated Magnetics Research, LLC, Huntsville, AL (US)

(72) Inventors: Jason N. Morgan, Madison, AL (US); Steven Murray, Huntsville, AL (US)

(73) Assignee: Correlated Magnetics Research, LLC, Huntsville, AL (US)

( * ) Notice: Subject to any disclaimer, the term of this patent is extended or adjusted under 35 U.S.C. 154(b) by 237 days.

(21) Appl. No.: 18/202,693

(22) Filed: May 26, 2023

(65) Prior Publication Data

US 2023/0386714 A1 Nov. 30, 2023

Related U.S. Application Data

(60) Provisional application No. 63/346,616, filed on May 27, 2022.

(51) Int. Cl.
*H01F 7/02* (2006.01)
*H01F 7/04* (2006.01)

(52) U.S. Cl.
CPC ......... *H01F 7/0242* (2013.01); *H01F 7/0247* (2013.01); *H01F 7/04* (2013.01)

(58) Field of Classification Search
CPC ........ H01F 7/0242; H01F 7/0247; H01F 7/04; H01F 7/0226
See application file for complete search history.

(56) References Cited

U.S. PATENT DOCUMENTS 6,304,163 B1 * 10/2001 Rippingale ........... H01F 13/003 335/302
2011/0037547 A1 * 2/2011 Cardone ............... B25B 11/002 335/289
2014/0320247 A1 * 10/2014 Fullerton .............. H01F 7/0278 335/306

* cited by examiner

*Primary Examiner* — Mohamad A Musleh
(74) *Attorney, Agent, or Firm* — Schwegman Lundberg & Woessner, P.A.

(57) ABSTRACT

A magnetic switch can be configured to have or provide a variable, user-selectable radial flux pattern. In an example, the switch comprises a magnetized outer structure and a magnetized inner structure provided at least partially inside of the magnetized outer structure. In an example, at least one of the magnetized inner and outer structures is rotatable relative to the other one of the magnetized inner and outer structures about an axis of rotation that is common to the magnetized outer structure and magnetized inner structure. The radial flux pattern can extend away from the common axis of rotation and can vary in strength according to a relative position of the magnetized inner and outer structures. In other examples, the switch can comprise multiple layers of magnetized structures.

20 Claims, 12 Drawing Sheets

RADIAL MAGNETIC SWITCH

CROSS-REFERENCE TO RELATED APPLICATIONS

This application is related to and claims priority to U.S. Provisional Application No. 63/346,616, filed on May 27, 2022, and entitled "Radial Magnetic Switch," the entirety of which is incorporated herein by reference.

BACKGROUND

Alignment characteristics of magnetic fields have been used to achieve precision movement and positioning of objects, such as in linear actuators, linear stages, rotation stages, goniometers, and mirror mounts. Magnets with precisely aligned fields or regions are used in packaging machinery, and positioning of valve pilot stages for fluid control systems. They are also used in various commercial products including floppy disk drives, flatbed scanners, printers, plotters and the like. In an example, a magnet, such as a manufactured magnet with programmed polarity regions, can be used in a loudspeaker assembly, actuator, gate, switch, or force transfer device, among other things.

SUMMARY

The present inventors have recognized that a problem to be solved includes providing a magnet or device that attracts in a radial direction. The present inventors have recognized that a further problem includes configuring the magnet or device that attracts in a radial direction to be switchable, that is, to selectively provide the magnetic attractive force in the radial direction. The present inventors have recognized that a solution to the problem can include or use a magnet structure having multiple, differently polarized regions and a magnetic circuit or pole piece(s) configured to direct flux from or between the differently polarized regions.

In an example, the magnet structure includes a magnetized inner disc structure having at least two oppositely polarized regions and a magnetized outer ring structure having at least two oppositely polarized regions, and the inner and outer magnetized structures can rotate relative to one another.

This summary is intended to provide an overview of the present subject matter. It is not intended to provide an exclusive or exhaustive explanation of the invention. The detailed description is included to provide further information about the present subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. In the drawings, which are not necessarily drawn to scale, like numerals can describe similar components in different views. The drawings illustrate generally, by way of example, but not by way of limitation, various embodiments discussed in the present document.

DETAILED DESCRIPTION

A magnetic switch can include a magnetized outer structure and a magnetized inner structure. The magnetized inner structure can be provided at least partially inside of the magnetized outer structure. Pole pieces can be provided on one or both opposite side surfaces of the magnetized structures, and the pole pieces can be configured to direct magnetic flux between oppositely oriented magnetic polarity regions of one or more of the magnetized outer structure or the magnetized inner structure. In an example, the pole pieces can be configured to direct magnetic flux between oppositely oriented magnetic polarity regions on the magnetized outer structure and the magnetized inner structure, that is, across a boundary or an air gap between the two structures.

The magnetized outer structure and magnetized inner structure can rotate relative to one another. That is, in an example, the location or orientation of the magnetized outer structure can be fixed or static relative to its central axis of rotation and the magnetized inner structure can be provided to rotate about the same axis. In another example, the magnetized outer structure and magnetized inner structure are each free, or partially free, to rotate about their common central axis.

Rotating the magnetized outer structure or magnetized inner structure can change a flux density and flux path in the pole pieces. For example, as the magnetized inner structure is rotated from a first or "off" angular position to a second or "on" angular position, the flux transitions from being substantially contained in the pole pieces to being routed radially outward, such as to the side edges of the pole pieces. That is, in the on angular position, or the relative on position of the magnetized outer structure and the magnetized inner structure, a magnetic field is provided in a region between the top pole piece and the bottom pole piece and provides an attractive magnetic force to a target in the radial direction (e.g., a direction extending toward or away from a common central axis of the magnetized outer and inner structures).

Figure 1:
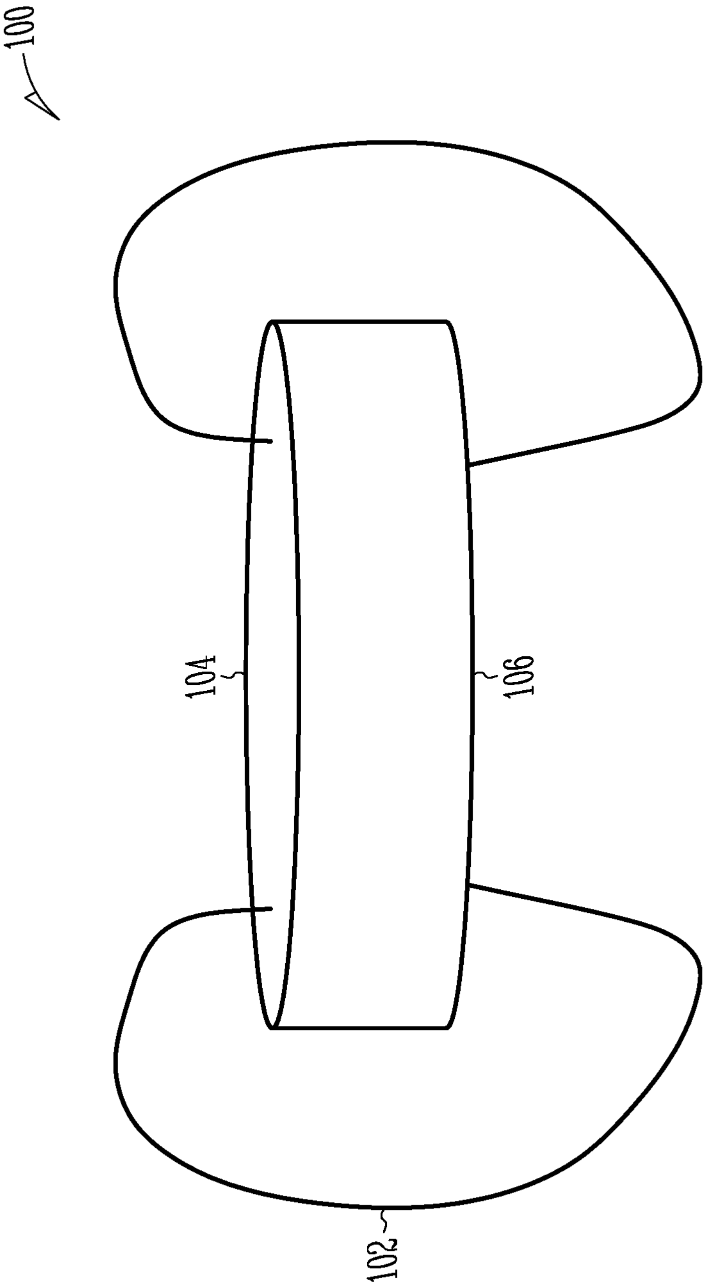
FIG. 1 illustrates generally an example of a first magnet with a pictorial representation of a flux pattern for the first magnet.

FIG. 1 illustrates generally an example of a first magnet 100 with a pictorial representation of a flux pattern 102 for the first magnet 100.

In the example of FIG. 1, the flux pattern 102 extends substantially from a top face 104 of the first magnet 100 to a bottom face 106 of the first magnet 100. The flux pattern 102 can extend, for example, around side edges of the first magnet 100, as shown in FIG. 1.

In the example of FIG. 1, the first magnet 100 is disc-shaped or puck-shaped. Though the disc or puck shape can be ideal for some applications, the first magnet 100 can be differently shaped. For example, the first magnet 100 can be a cube, prism, sphere, or other shape. The shape and polarity of the first magnet 100 can affect the force or flux profile of the first magnet 100. In an example, the first magnet 100 can be axially magnetized where the magnetization direction is through an axis of rotation of the first magnet 100 (e.g., the vertical axis in the illustrated example of FIG. 1).

Figure 2:
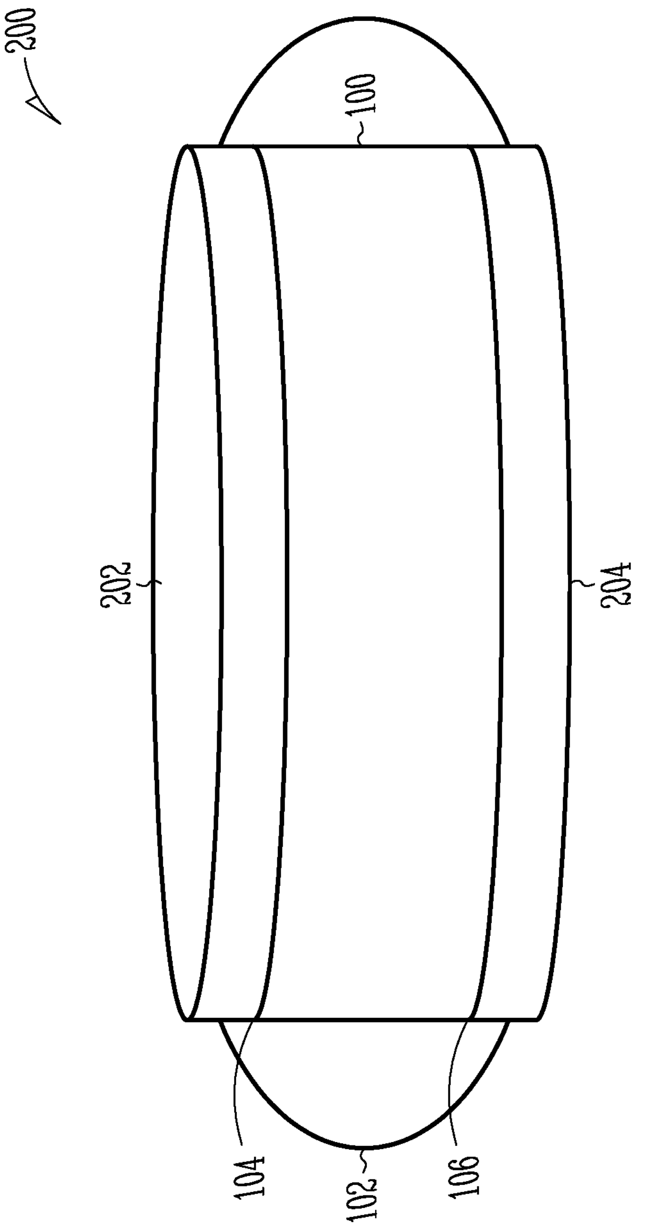
FIG. 2 illustrates generally an example of a first magnet assembly with a first pole piece and a second pole piece provided on respective faces of the first magnet.

FIG. 2 illustrates generally an example of a first magnet assembly 200 with a first pole piece 202 and a second pole piece 204 provided on respective faces 104, 106 of the first magnet 100.

In an example, the first pole piece 202 can be provided on, or coupled to, a top face 104 of the first magnet 100. The second pole piece 204 can be provided on, or coupled to, a bottom face 106 of the first magnet 100. The first pole piece 202 and second pole piece 204 can be configured to shunt substantially all or a portion of the flux that extends axially away from the first magnet assembly 200.

In an example, the first pole piece 202 and second pole piece 204 can be configured to capture, redirect, or route flux toward the side edges of the magnet, thereby providing a relatively strong, radially-oriented magnetic attractive force compared to the radially-oriented force from the example of the first magnet 100 from FIG. 1. In an example, the flux pattern 102 can extend radially away from the first magnet assembly 200, such as between the first pole piece 202 of the first magnet assembly 200 and the second pole piece 204 of the first magnet assembly 200, and substantially or entirely without extending axially above or below the pole pieces 202, 204.

Figure 3:
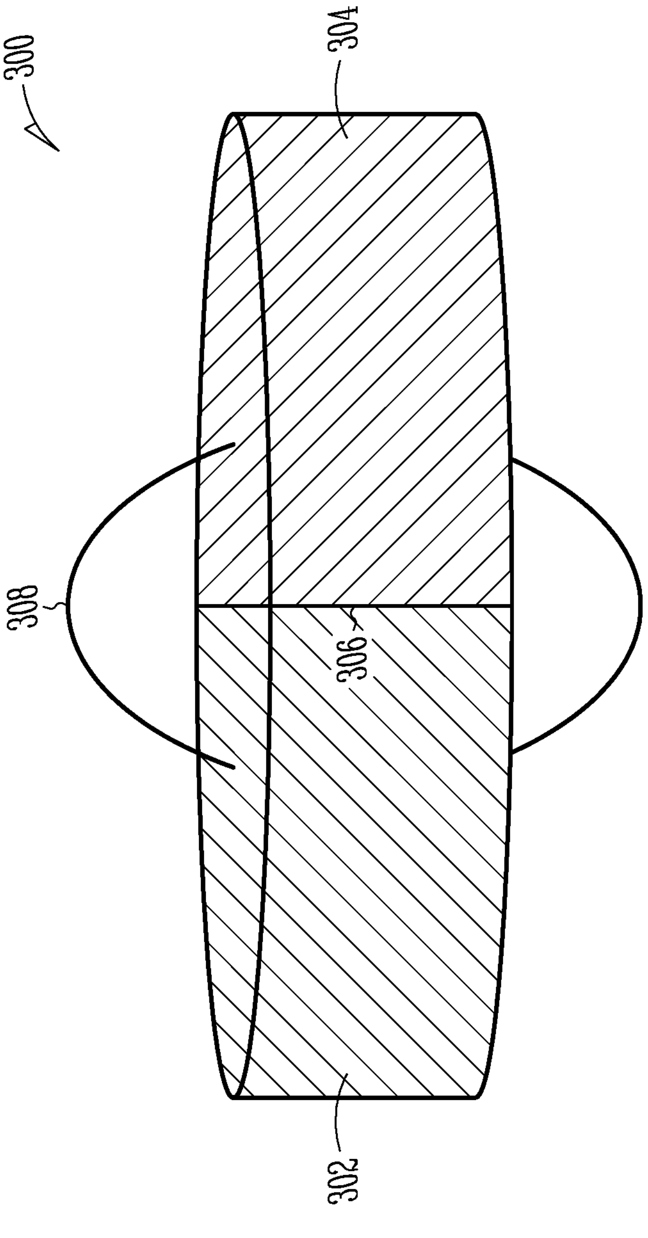
FIG. 3 illustrates generally an example of a second magnet having first and second magnetic polarity portions that are oppositely oriented.

FIG. 3 illustrates generally an example of a second magnet 300 having first and second magnetic polarity portions 302, 304 that are oppositely oriented.

In the example of FIG. 3, each of the different magnetic polarity regions 302, 304 can have the same surface area or mass, however other configurations can be used. In the example of FIG. 3, most flux from the second magnet 300 travels axially between the different polarity portions with central boundary 306 acting as a transition area between polarities. That is, a flux pattern 308 can extend outside of the magnet itself, such as from the first magnetic polarity region 302 of the second magnet 300 to the second magnetic polarity region 304 of the second magnet 300.

Figure 4:
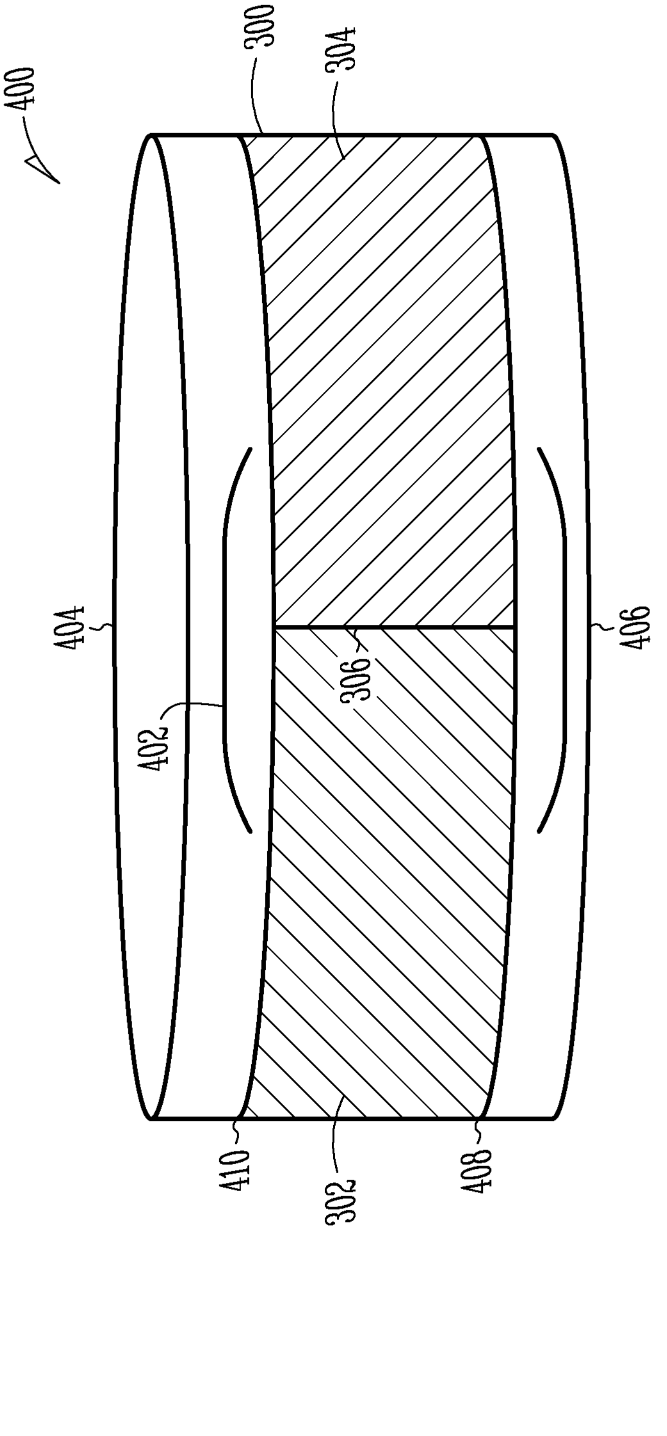
FIG. 4 illustrates generally an example of a second magnet assembly with a first pole piece and a second pole piece provided on respective faces of the second magnet.

FIG. 4 illustrates generally a first example of a second magnet assembly 400 including the second magnet 300 comprising the first and second magnetic polarity portions 302, 304. The second magnet assembly 400 further includes a first pole piece 404 coupled to a top face 410 of the second magnet 300 and a second pole piece 406 coupled to a bottom face 408 of the second magnet 300.

In the example of FIG. 4, the first pole piece 404 and the second pole piece 406 can be configured to receive or capture substantially all of the flux from the second magnet 300. That is, the first pole piece 404 and the second pole piece 406 can be configured to have sufficient size, mass, and surface area such that the first pole piece 404 and the second pole piece 406 are not saturated by flux from the second magnet 300. Accordingly, in this example, a minimum amount of magnetic flux leakage occurs in the radial direction. In the illustrated example of FIG. 4, all of the flux from the second magnet 300 can be contained by the first pole piece 404 and the second pole piece 406, as indicated pictorially by the flux pattern 402 within the pole pieces.

In an example, the first pole piece 404 and the second pole piece 406 can be differently configured in size, shape, mass, and orientation if saturation is desired for a particular application. In some examples, the pole pieces can comprise multiple pieces or components that overlay only a portion of a surface of the second magnet 300. For example, a pole piece void can be provided at the central boundary 306 between the first magnetic polarity region 302 and second magnetic polarity region 304.

In an example, the first pole piece 404 can be used to shunt flux across the top face 410 of the second magnet 300, and the second pole piece 406 can be used to shunt flux across the bottom face 408 of the second magnet 300. In an example, if one or both of the first pole piece 404 and the second pole piece 406 is saturated, then flux can be forced to the side edges of the second magnet assembly 400, thereby providing a magnetic force at or around the circumference of the second magnet assembly 400. In an example, a thickness of the first pole piece 404 and the second pole piece 406 can be selected or changed to correspondingly provide a change in flux. In the example of FIG. 4, the first pole piece 404 and the second pole piece 406 are configured to not saturate when loaded with the second magnet 300.

Figure 5:
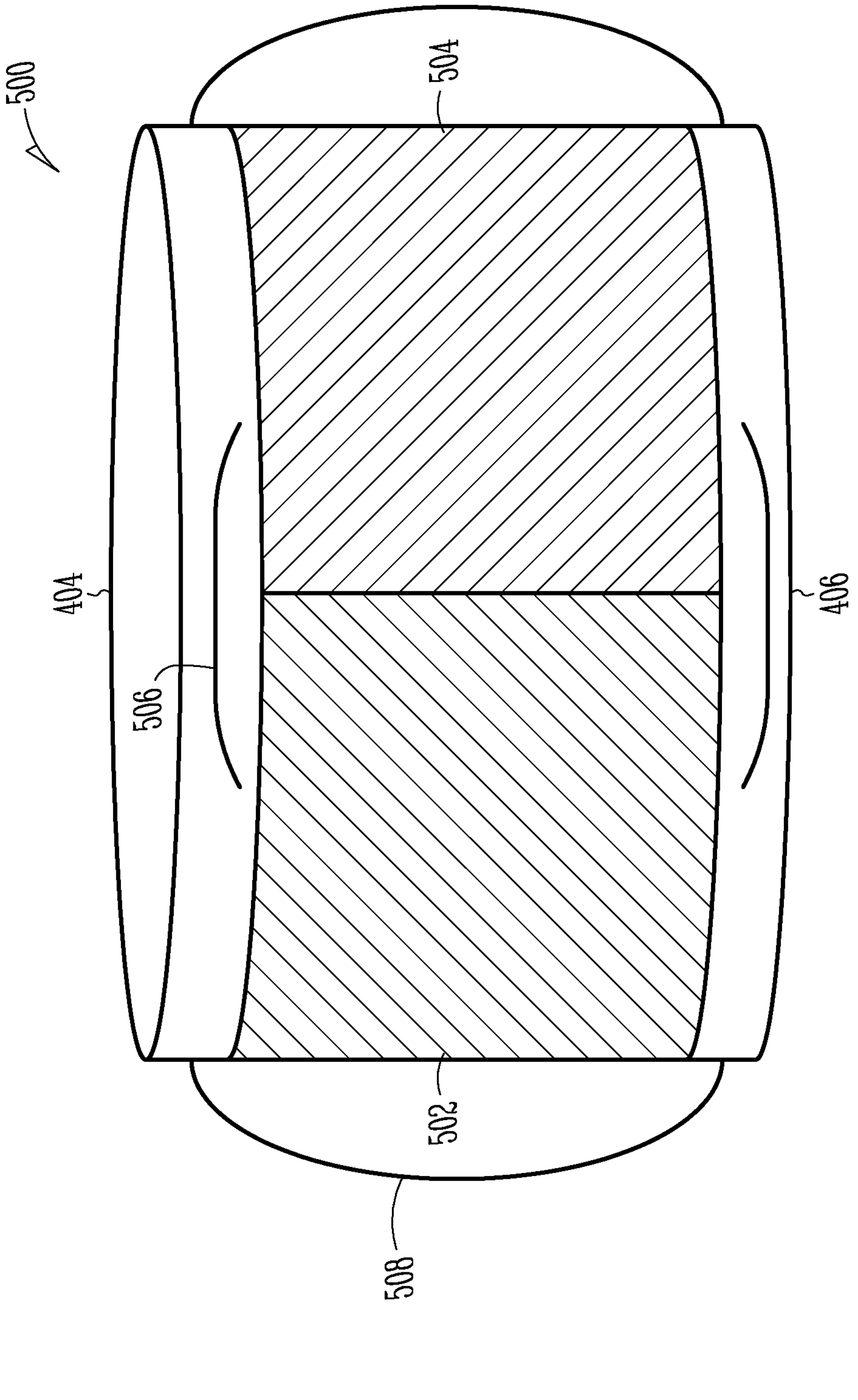
FIG. 5 illustrates generally an example of a third magnet assembly.

FIG. 5 illustrates generally an example of a third magnet assembly 500. The third magnet assembly 500 can include a scaled-up (i.e., physically larger) instance of the second magnet 300, and can include a first magnetic polarity region 502 and a second magnetic polarity region 504. The example of the third magnet assembly 500 includes the first pole piece 404 and the second pole piece 406 from the example of FIG. 4.

In the example of FIG. 5, the first pole piece 404 and the second pole piece 406 can be undersized to accommodate the flux from the first magnetic polarity region 502 and the second magnetic polarity region 504. That is, in the example of FIG. 5, the first pole piece 404 and the second pole piece 406 receive or capture less than all of the flux from the magnet, and each pole piece is magnetically saturated. Accordingly, in this example, a non-negligible amount of magnetic flux leakage occurs in the radial direction according to a radial flux pattern 508. The radial flux pattern 508 extends from the first pole piece 404 to the second pole piece 406.

In several of the following examples, top views or cross-section views of various magnet assemblies (e.g., magnetic switches) are shown, and pole pieces are omitted. However, it is to be understood that one or more pole pieces can be used in each of the examples to help direct or contain flux and control a radial flux pattern. The pole pieces used can be configured in various ways, such as with or without an air gap or central boundary, and can be configured to have different thicknesses, profiles, or other characteristics. For example, although the pole pieces described and illustrated above are generally uniform, disc-shaped objects, other pole piece configurations can have undulating or irregular surface profiles or other features to selectively receive or route flux. The examples are also not limited to two pole pieces and can include additional or fewer pole pieces.

Figure 6:
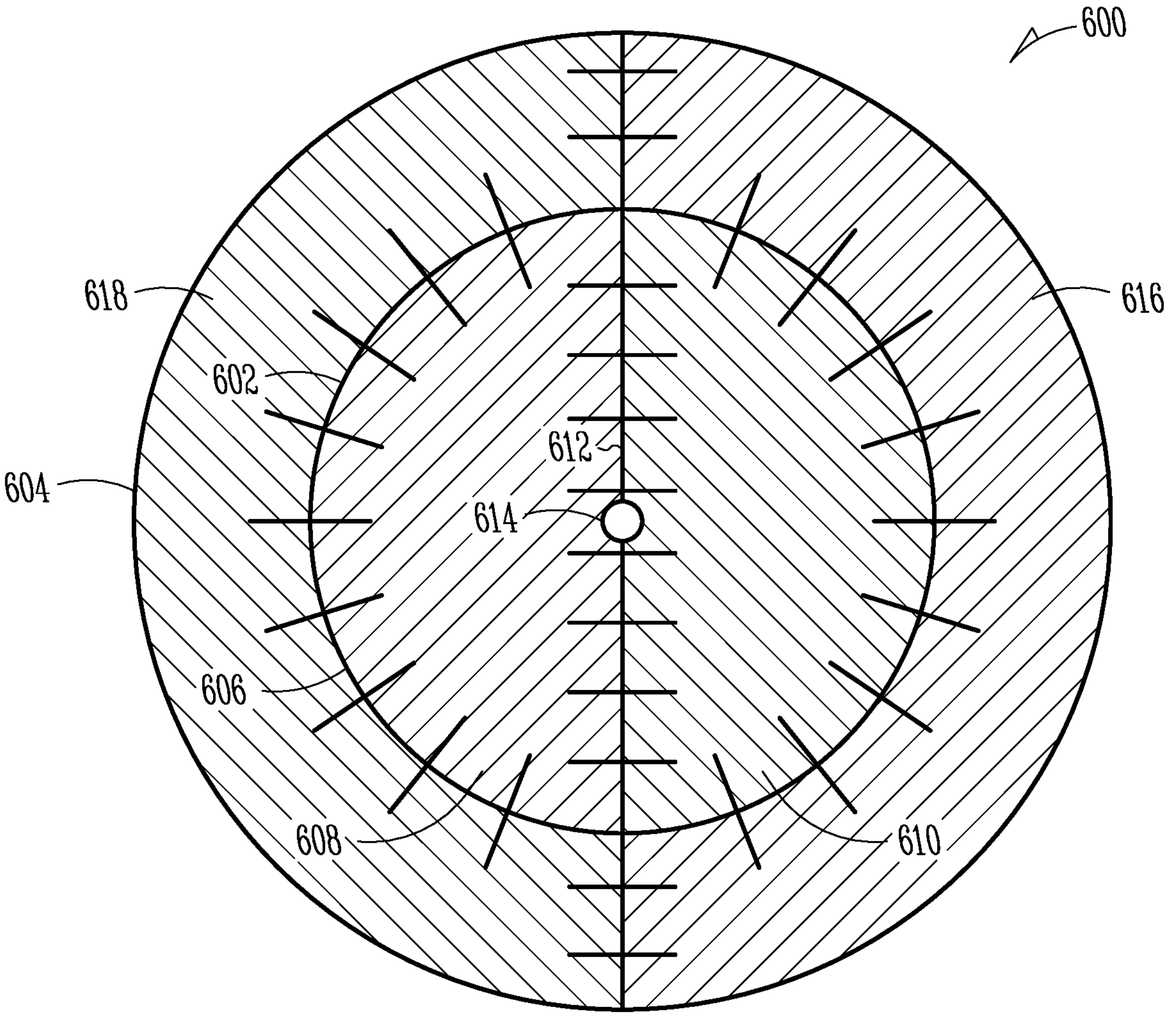
FIG. 6 illustrates generally an example of a magnetic switch including a magnetized inner structure and a magnetized outer structure, and the magnetic switch is in an off position.

FIG. 6 illustrates generally a top view of an example of a first magnetic switch 600 including a magnetized inner structure 602 and a magnetized outer structure 604. In the example of FIG. 6, the first magnetic switch 600 is illustrated in an off position, with zero or minimal magnetic flux extending radially away from the side edges, or outer circumference, of the first magnetic switch 600.

Each of the magnetized inner structure 602 and the magnetized outer structure 604 comprises at least two regions having different magnetic polarities. For example, the magnetized inner structure 602 includes a first magnetic polarity region 608 having a first magnetic polarity, and a second magnetic polarity region 610 having an opposite second magnetic polarity. The first magnetic polarity region 608 is adjacent to the second magnetic polarity region 610 at a central boundary 612 that extends through an axis 614 of the first magnetic switch 600.

The magnetized outer structure 604 includes a third magnetic polarity region 616 having the first magnetic polarity, and includes a fourth magnetic polarity region 618 having the opposite second magnetic polarity. The third magnetic polarity region 616 is adjacent to the fourth magnetic polarity region 618 at the central boundary 612. In this example, the first magnetic polarity and the opposite second magnetic polarity refer to oppositely-oriented polarity regions. That is, if the first magnetic polarity regions 608 and the third magnetic polarity region 616 are magnetic south, then the second magnetic polarity region 610 and the fourth magnetic polarity region 618 are magnetic north. In an example, each of the different polarity regions can comprise a different discrete magnetic structure.

When magnet structures with opposite polarities interact, there is an area of transition where the magnetic particles are randomized. These areas can be substantially unmagnetized, or similar to an air gap. In some examples, an air gap can be provided at the boundary between any two magnetic structures that have opposite polarities. The size, shape, profile, or orientation of such air gap(s) can be selected to achieve particular radial flux patterns from the magnetic switches described herein. The width of the transition areas can be changed by, for example, using printed magnets where printed refers to a magnet at magnetized at least in part using maxels created by a spot magnetizer such as the MagPrinter 6.0 by Correlated Magnetics Research or by using an assembly of conventional, fixture-magnetized magnets. For clarity in the figures, air gaps are omitted, however, it should be appreciated that an air gap (or other unmagentized structure) can be provided at or between any of the magnetized structures or regions discussed herein.

In an example, a total south flux attributable to the first magnetic polarity region 608 can be substantially equal to a total south flux attributable to the third magnetic polarity region 616, and a total north flux attributable to the second magnetic polarity region 610 can be substantially equal to a total north flux attributable to the fourth magnetic polarity region 618. In an example, a total south flux for the first magnetic switch 600 (e.g., due to the first magnetic polarity region 608 and third magnetic polarity region 616) can be substantially equal to a total north flux for the first magnetic switch 600 (e.g., due to the second magnetic polarity region 610 and the fourth magnetic polarity region 618).

In FIG. 6, the relative orientation of the various magnetic polarity regions can provide a magnetic short, or flux path, in the pole pieces (pole pieces are not illustrated in the example of FIG. 6) for flux between the different, oppositely-oriented magnetic polarity regions. In the example of FIG. 6, the flux path is represented by lines extending across the boundaries between the different regions, however, the actual flux path can be understood to flow in an arc through the pole pieces, and above or below the magnet. FIG. 6 represents an off position for the first magnetic switch 600 because the switch flux is substantially contained inside the switch (i.e., in the pole pieces), with little or no flux extending radially away from the outer edges of the first magnetic switch 600 (i.e., radially away from the axis 614 from the outer edges of the third magnetic polarity region 616 and the fourth magnetic polarity region 618).

While in the off position as shown in FIG. 6, the first magnetic switch 600 can correspond to a minimum amount of flux extending radially from the magnetized outer structure 604. That is, flux at the side edges of the first magnetic switch 600 can be minimized. In an example, flux can be transmitted between the magnetized inner structure 602 and the magnetized outer structure 604 with or without using pole pieces as a flux path, such as depending on characteristics (e.g., mass, location, surface area, etc.) of the first magnetic switch 600 and the pole pieces used.

The first magnetic switch 600 can comprise components or magnetic polarity regions having various shapes or configurations. In the illustrated example, the first magnetic switch 600 is disc-shaped, but other shapes can similarly be used. In an example, the magnetic polarity regions can have complementary shapes such that an outer boundary of the magnetized inner structure 602 corresponds to an inner boundary of the magnetized outer structure 604. In FIG. 6, for example, the outer boundary of the magnetized inner structure 602 is circular and the inner boundary of the magnetized outer structure 604 is similarly circular such that the magnetized inner structure 602 fits concentrically inside of the magnetized outer structure 604. In other examples, the magnetized outer structure 604 can be, for example, prism or cube shaped, such as with a void in its central region (e.g., a ring-shaped hole) and the magnetized inner structure 602 can have the shape of a disc. Such a structure can create a different radial flux profile, for example, than the structure shown in FIG. 6. The first magnetic switch 600 can thus be configured to have any shape, size, pattern, or structure, with the shape and polarity pattern affecting the radial flux profile.

Figure 7:
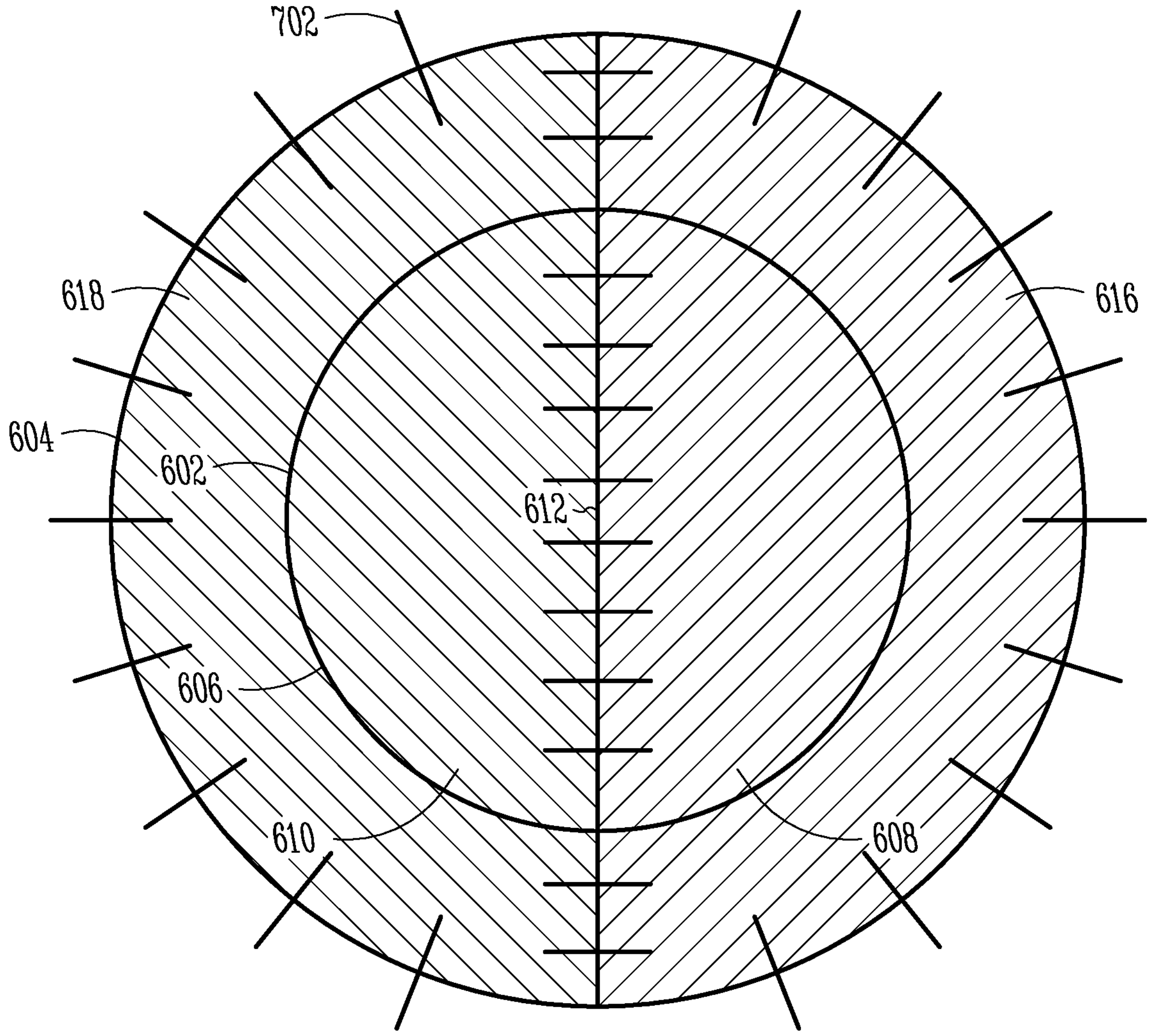
FIG. 7 illustrates generally an example of a magnetic switch including a magnetized inner structure and a magnetized outer structure, and the magnetic switch is in an on position.

FIG. 7 illustrates generally an example of the first magnetic switch 600 in an on position. In the example of FIG. 7, the magnetized inner structure 602 is rotated by 180 degrees about the axis 614 central axis relative to the example of FIG. 6. In the example of FIG. 7, a portion of the available flux from the first magnetic switch 600 can extend beyond an outer edge or side of the magnetized outer structure 604, and the flux can be directed radially outward through the pole pieces (pole pieces are not illustrated in the example of FIG. 7).

In the example of FIG. 7, with the first magnetic switch 600 on, magnetic flux can be directed radially outward from an outer edge of the switch. In the on position, flux from the magnetized inner structure 602 and magnetized outer structure 604 can add and flow toward the outer edge of the switch.

The examples of FIG. 6 and FIG. 7 show generally that the first magnetic switch 600 can include magnetic field emission sources, or magnet structures, that can add flux together to increase or decrease an available flux on the pole pieces depending on the relative orientation of the magnetized inner structure 602 and magnetized outer structure 604 and the polarity of the regions that comprise the inner and outer structures. Although each of the inner and outer magnetic structures is shown as having a pair of oppositely-oriented polarity regions, other configurations can similarly be used, including multi-pole or coded magnet structures or configurations. Such a multiple pole, or coded, structure can be used to configure or change a radial force or attraction characteristic for the magnetic switch, such as for various relative positions of the magnetized inner structure 602 and magnetized outer structure 604. That is, different magnetic properties can be provided depending on a relative orientation or turn angle of the switch. For example, by differently coding the different polarity regions of the magnetized inner and outer structures, switch configurations other than fully on/partially on/fully off can be provided. For example, a fully on/partially on configuration can be provided, or a partially on/fully off configuration can be provided. Various other combinations can similarly be realized by adjusting or selecting a number or location of different polarity regions used in the switch.

Figure 8:
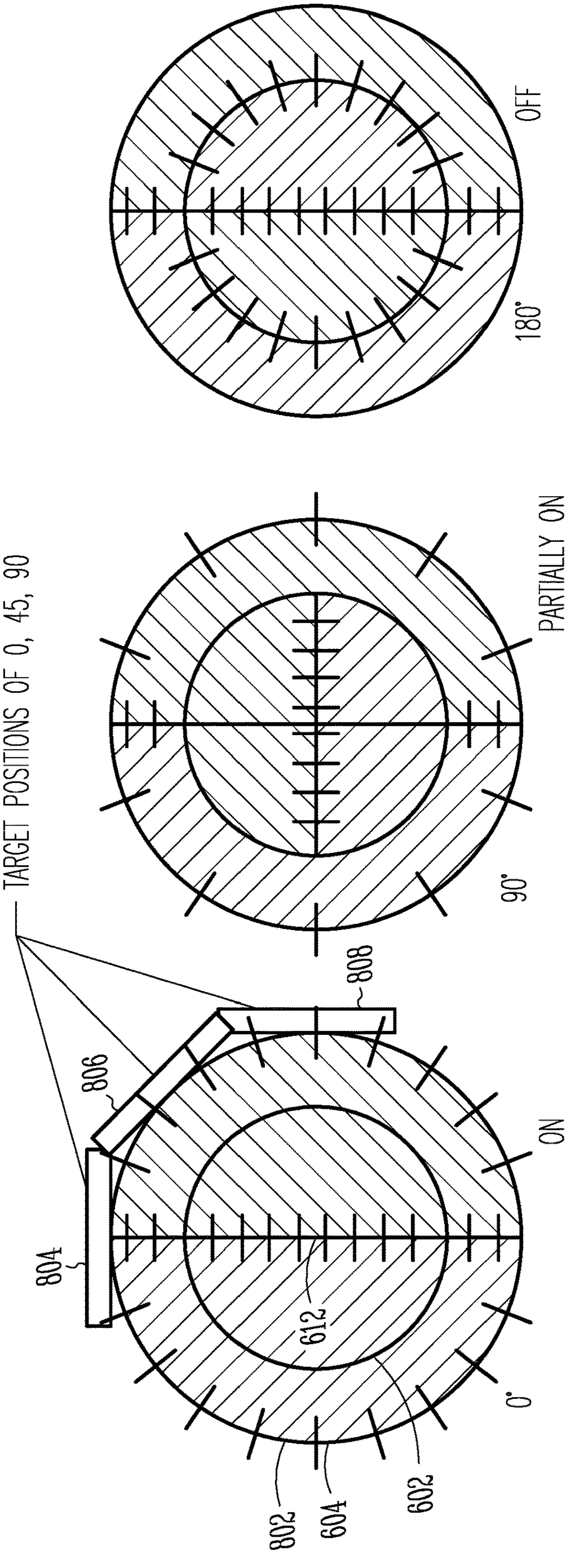
FIG. 8 illustrates generally an example of a magnetic switch in off, partially on, and on positions.

FIG. 8 illustrates generally examples of the first magnetic switch 600 in different configurations, including "on" (figure at left), "partially on" (figure at center), and "off" (figure at right) configurations or positions. The illustrated examples in FIG. 8 omit pole pieces from the drawings, however, it is to be understood that the first magnetic switch 600 includes or uses pole pieces to provide radial flux. The off and on positions are discussed herein at FIG. 6 and FIG. 7, respectively. In the on position, the magnetized inner structure 602 is in a reference position, or is rotated zero degrees. In the on position, the magnetic structure regions having the same polarity are adjacent or aligned, and a maximum amount of radial flux is provided. In the off position, the magnetized inner structure 602 is rotated 180 degrees, and the magnetic structure regions having the same polarity are oppositely oriented, and a minimum amount of radial flux is provided (e.g., zero flux). In the partially on position, the magnetized inner structure 602 is rotated 90 degrees from the zero degree or reference position. Consequently, some magnetic flux extends radially away from the outer side edge of the first magnetic switch 600 (e.g., away from the outer side edge of the pole pieces used with the first magnetic switch 600) in the partially on position. The amount of flux provided in the partially on position is less than when the magnetized inner structure 602 is in the reference position, and is greater than when the magnetized inner structure 602 is rotated 180 degrees.

To further illustrate the radial flux behavior of the first magnetic switch 600, targets or magnetometers can be placed adjacent to the side edges of the switch at various radial positions. In the example of FIG. 8, a first target 804 can be provided at an outer edge of the first magnetic switch 600 (e.g., including its pole pieces) at zero degrees, a second target 806 can be provided at an outer edge of the first magnetic switch 600 at 45 degrees, and a third target 808 can be provided at an outer edge of the first magnetic switch 600 at 90 degrees. In the example of FIG. 8, the zero degrees position coincides with a position of the central boundary 612 of the magnetized outer structure 604. The amount of radial flux at the targets varies due to the position of the target against the first magnetic switch 600 and its relationship to the central boundary 612 and orientation of the magnetized inner structure 602.

Figure 9:
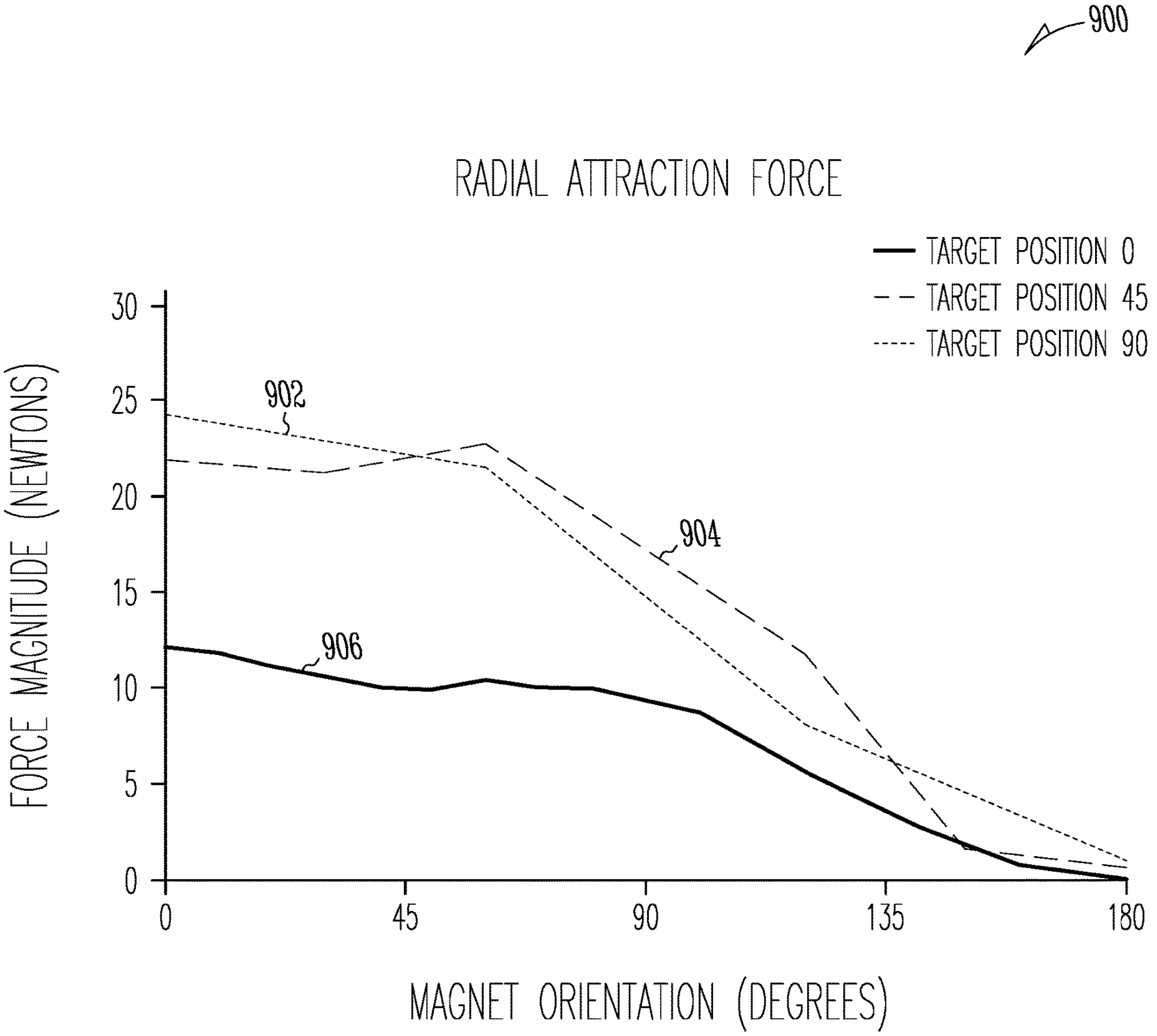
FIG. 9 illustrates generally an example of a radial attraction force chart.

FIG. 9 illustrates generally an example of a radial attraction force chart 900 showing radial flux of the first magnetic switch 600 as measured from the first target 804, the second target 806, and the third target 808, and as an orientation of the magnetized inner structure 602 rotates from the reference position or zero degrees to 180 degrees. That is, FIG. 9 shows a relationship between radial attraction force from the first magnetic switch 600, as measured at various positions around the switch, and as the orientation of the magnetized inner structure 602 rotates.

The Y axis indicates the force measured in Newtons from the target, and the X axis indicates the orientation of the magnetized inner structure 602 from 0 degrees (see, e.g., FIG. 8, at left) to 180 degrees (see, e.g., FIG. 8, at right). In the example of FIG. 9, the line "Target Position 0" can correspond to a force measurement from the location of the first target 804. In other words, the line "Target Position 0" can correspond to a radial force measured from an outer edge of the first magnetic switch 600 at the location of the first target 804 while the position of the magnetized inner structure 602 is rotated from 0 degrees to 180 degrees. The line "Target Position 45" corresponds to a radial force measured from the first magnetic switch 600 at the second target 806 and as the magnetized inner structure 602 is rotated from 0 degrees to 180 degrees, and the line "Target Position 90" corresponds to a radial force measured from the first magnetic switch 600 at the third target 808 and as the magnetized inner structure 602 is rotated from 0 degrees to 180 degrees.

Figure 10:
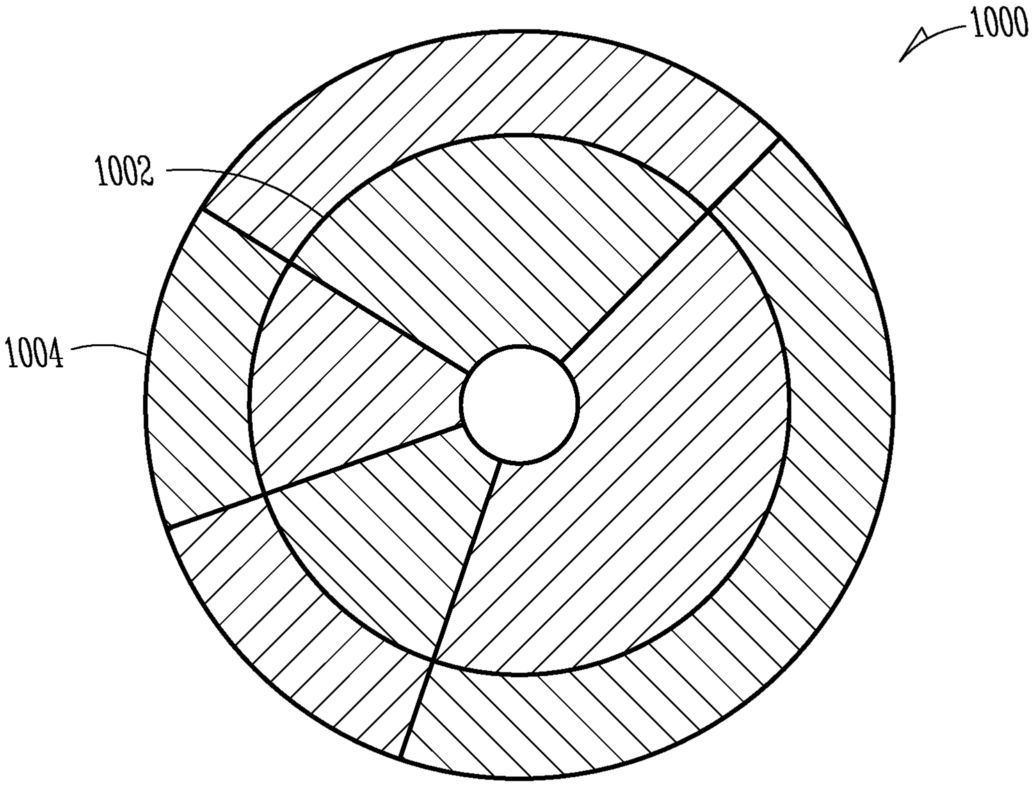
FIG. 10 illustrates generally a top view of a magnetic switch comprising coded magnet structures.

FIG. 10 illustrates generally a top view of a second magnetic switch 1000 comprising coded magnet structures. The structures are considered "coded" because multiple different polarity regions are provided adjacent to one another. The second magnetic switch 1000 includes a magnetized inner structure 1002 and a magnetized outer structure 1004. Each of the magnetized structures includes four discrete magnetic polarity regions. For example, the magnetized inner structure 1002 can include four regions, and each region can have a magnetic polarity that is opposite to its adjacent regions. Similarly, the magnetized outer structure 1004 can include four regions, and each region can have a magnetic polarity that is opposite to its adjacent regions.

The example of FIG. 10 illustrates the second magnetic switch 1000 in an off position, such as with a minimum amount of radial flux available at the side edges of the assembly. In the example, the magnetized inner structure 1002 or the magnetized outer structure 1004 can be configured to rotate about a common central axis to thereby turn the switch to an on position.

In an example, various configurations (e.g., in terms of total mass, volume, surface area, etc.) of the different magnetic polarity regions of the second magnetic switch 1000 can be used. For example, a total volume of "north" oriented magnetic material in the second magnetic switch 1000 can be substantially the same as, or can be unequal to, a total volume of "south" oriented magnetic material in the second magnetic switch 1000.

In an example, the different north and south regions, or materials comprising these regions, can be differently apportioned among the magnetized inner structure 1002 and the magnetized outer structure 1004, as shown in the example of FIG. 10. For example, the magnetized inner structure 1002 can comprise two, three, or four magnetic polarity regions. In examples including several magnetic polarity regions, each region can be differently sized or shaped. Each region can also be tailored to create specific flux patterns as the structures of the second magnetic switch 1000 rotate relative to each other. In an example, one region can have a larger mass, volume, and/or surface area, while the other polarity regions can have less mass, less volume, or less surface area. In another example, one polarity region can be of a larger size while the other polarity regions are of a smaller size, such as shown in the example of FIG. 10. The examples can include multiple regions with alternating oppositely-oriented polarity regions.

When the second magnetic switch 1000 is turned on (e.g., when the magnetized inner structure 1002 or the magnetized outer structure 1004 is rotated away from the configuration illustrated in FIG. 10), the second magnetic switch 1000 can provide radially-extending flux. In an example that includes the first magnetic switch 600 and the second magnetic switch 1000 having substantially the same total magnetic material mass, an amount of available flux, or the resulting radial force from the example of FIG. 10, will be less than an amount of available flux or radial force from, e.g., the first magnetic switch 600 from the example of FIG. 7 when FIG. 7 is turned to a fully on position (e.g., the position illustrated in FIG. 7). Other configurations can additionally or alternatively be used to yield greater or lesser radial flux.

Figure 11:
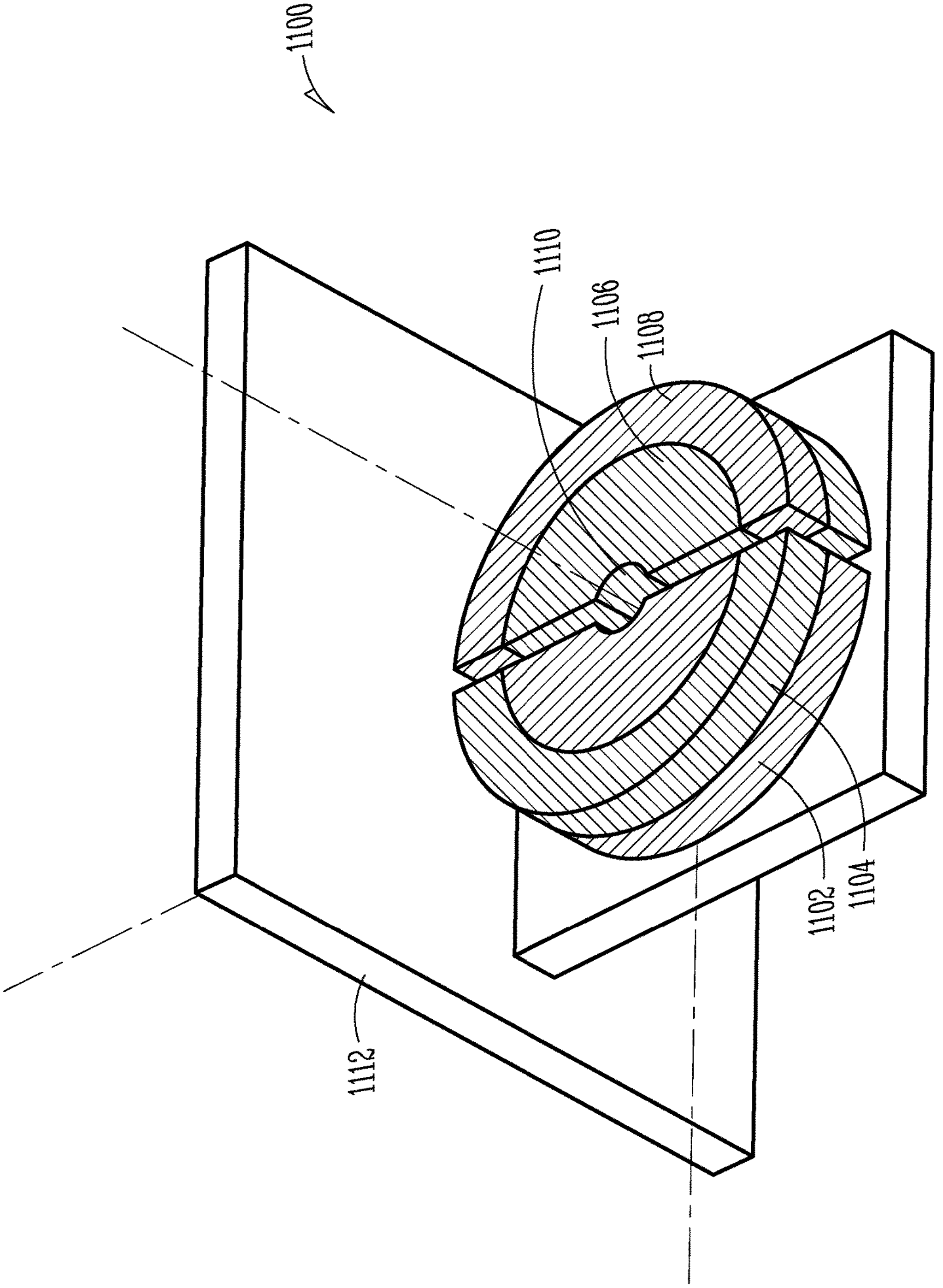
FIG. 11 illustrates generally an example of a third magnetic switch comprising a first structure layer and a second structure layer.

FIG. 11 illustrates generally an example of a third magnetic switch 1100 comprising a first structure layer 1102 and a second structure layer 1104. In an example, the first structure layer 1102 includes a magnetized inner structure 1106 and a magnetized outer structure 1108. In an example, the magnetized inner structure 1106 comprises magnetic material having a first magnetic polarity, and the magnetized outer structure 1108 comprises magnetic material having an opposite second magnetic polarity. The second structure layer 1104 can include magnetized inner, outer, and/or intermediate structures, such as can be configured to be similarly sized and shaped to the structures of the first structure layer 1102, but oppositely oriented in terms of magnetic polarity.

In an example, each of the first structure layer 1102 and the second structure layer 1104 comprises an instance of the first magnetic switch 600. The layers can be provided adjacent to each other, with the bottom face of the first structure layer 1102 atop the top face of the second structure layer 1104. In an example, one or more intermediate layers or other magnetically conductive or non-conductive materials can be interposed between the layers. In the example of FIG. 11, the magnetized outer structures 604 of the layers can be oppositely aligned, such that a portion of the magnetized outer structure of the first structure layer 1102 having a first polarity is adjacent to a portion of the magnetized outer structure of the second structure layer 1104 having an opposite second polarity. Other configurations can similarly be used.

In an example, at least one of the first structure layer 1102 and the second structure layer 1104 or portions thereof can be configured to rotate relative to the other layer or other portions thereof, such as about an axis of rotation that extends through a central hole 1110 of the third magnetic switch 1100. Pole pieces can be provided on top and bottom sides of the third magnetic switch 1100, such as to route radial flux toward a target 1112.

In the example of FIG. 11, the central hole 1110 portion of one or both of the first structure layer 1102 or the second structure layer 1104 can comprise a D-shaped collar configured to receive a D-shaped shaft. In an example, a first layer comprises the D-shaped collar and a second layer comprises a ring-shaped collar. In this example, a D-shaped shaft can be configured to engage with the first layer using the D-shaped collar without engaging the second layer, such that the first layer (or a magnetized inner structure portion of the first layer) can be rotated relative to the second layer using the shaft. Other complementary collar and shaft configurations can similarly be used to cause rotation of the first structure layer 1102 (or a portion thereof) relative to the second structure layer 1104 (or a portion thereof). As one or both of the layers 1102, 1104 rotate, a variable radial flux pattern can be provided in a direction that extends radially away from an outer edge of the third magnetic switch 1100, such as toward the target 1112.

Figure 12:
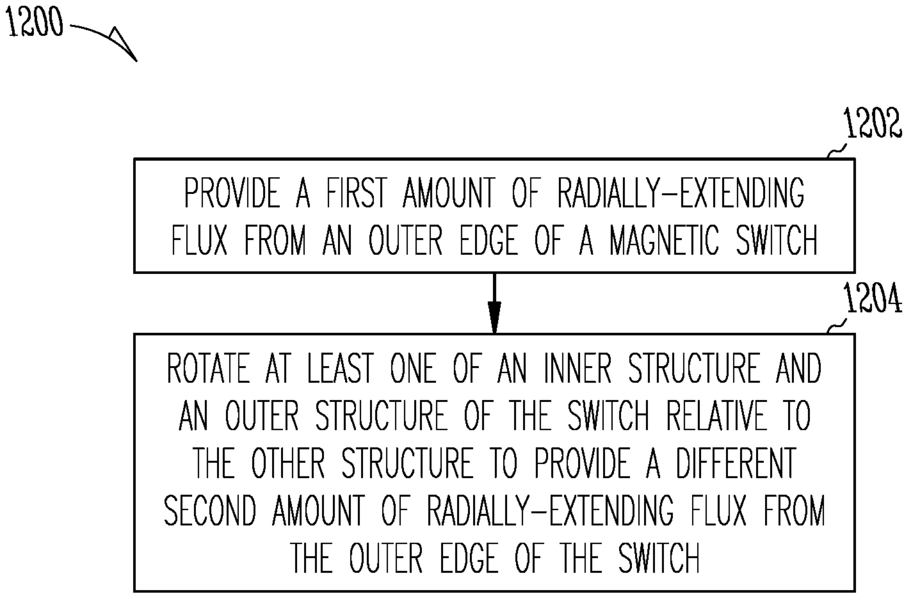
FIG. 12 illustrates generally an example of a method that can include configuring a magnetic switch.

FIG. 12 illustrates generally an example of a method 1200 that can include using a magnetic switch to provide first and different second amounts of radially-extending flux. In an example, the method 1200 can include or use any one or more of the magnetic switches discussed herein, such as the first magnetic switch 600, the second magnetic switch 1000, or the third magnetic switch 1100, among others.

At operation 1202, the method 1200 can include providing a first amount of radially-extending flux from an outer edge of a magnetic switch. In an example, operation 1202 can include or use a magnetized inner structure and a magnetized outer structure, wherein one or both of the magnetized structures are configured to move or rotate relative to the other. For example, the inner and outer structures can be provided coaxially and configured to rotate about the same axis. In another example, additionally or alternatively to using inner and outer structures, the magnetized structures can correspond to different layers or planes, and one or more of the layers can move relative to at least one other.

At operation 1204, the method 1200 can include rotating at least one of the magnetized structures to thereby provide a different second amount of radially-extending flux from the outer edge of the magnetic switch. For example, operation 1204 can include rotating at least one of a magnetized inner structure and magnetized outer structure relative to the other one of the magnetized inner and outer structure to provide a different second amount of radially-extending flux from the magnetized outer structure, wherein the rotation is about an axis of rotation that is common to the magnetized outer structure and magnetized inner structure. In an example that includes a layered switch, the rotation can include rotating a first layer relative to one or more other layers of magnetic material.

In an example, the method 1200 can include or use pole pieces, on opposite sides of the magnetized structures of the switch, to route flux toward radial side edges of the switch. The pole pieces can comprise steel or other ferromagnetic materials. In an example, the pole pieces are configured to shunt substantially all flux from the magnetized outer and inner structures when the magnetic switch is in an off state, such as corresponding to a minimum amount of flux extending radially from the magnetized outer structure.

In an example, the method 1200 can include, at a first rotational orientation of the magnetized outer and inner structures, providing substantially zero flux radially away from the magnetic switch, and at a second rotational orientation of the magnetized outer and inner structures providing a non-zero amount of flux radially away from the magnetized outer structure.

Various aspects of the present disclosure can be used to provide a magnetic switch with a variable, radial flux pattern, as set forth in the following Examples.

Example 1 can include a magnetic switch having a variable radial flux pattern, the magnetic switch comprising a magnetized outer structure and a magnetized inner structure provided at least partially inside of the magnetized outer structure. In Example 1, at least one of the magnetized inner and outer structures is rotatable relative to the other one of the magnetized inner and outer structures about an axis of rotation that is common to the magnetized outer structure and magnetized inner structure, and the variable radial flux pattern extends away from the common axis of rotation and varies in strength according to a relative position of the magnetized inner and outer structures.

In Example 2, the subject matter of Example 1 can optionally include, in a first orientation of the magnetized outer and inner structures, substantially zero radial flux extends radially away from the magnetized outer structure, and in a second orientation of the magnetized outer and inner structures, a non-zero amount of radial flux extends radially away from the magnetized outer structure.

In Example 3, the subject matter of Example 2 includes the first and second orientations being 180 degrees apart.

In Example 4, the subject matter of Examples 1-3 can optionally include a first pole piece provided on a top face of the magnetized outer structure and magnetized inner structure and a second pole piece provided on a bottom face of the magnetized outer structure and magnetized inner structure, wherein the first and second pole pieces are configured to shunt substantially all of the flux from the magnetized outer and inner structures when the magnetic switch is in an off state.

In Example 5, the subject matter of Examples 1~4 can optionally include at least one of the magnetized outer and inner structures comprises a printed magnet structure, an assembled magnet structure, or a conventional fixture-magnetized magnet structure.

In Example 6, the subject matter of Examples 1-5 can optionally include the magnetized outer structure comprises at least two magnetic polarity regions, and the magnetized inner structure comprises at least two magnetic polarity regions.

In Example 7, the subject matter of Example 6 can optionally include the magnetized outer structure comprises n magnetic polarity regions, and wherein the magnetized inner structure comprises n magnetic polarity regions, wherein n is an integer greater than two.

In Example 8, the subject matter of Examples 1-7 can optionally include the magnetized outer structure comprises a ring-shaped magnetic structure comprising at least one pair of different polarity regions, and the magnetized inner structure comprises a ring-shaped magnetic structure comprising at least one pair of different polarity regions.

In Example 9, the subject matter of Examples 1-8 can optionally include the magnetized outer structure comprises a ring-shaped magnetic structure comprising at least one pair of different polarity regions, and the magnetized inner structure comprises a disc-shaped magnetic structure comprising at least one pair of different polarity regions.

In Example 10, the subject matter of Examples 8-9 can optionally include an air gap between the magnetized inner and outer structures.

In Example 11, the subject matter of Examples 1-10 can optionally include the magnetized inner structure comprises at least one pair of different polarity regions, wherein the magnetized outer structure is configured to substantially surround an outer side edge of the magnetized inner structure, and the magnetized outer structure comprises at least one pair of different polarity regions.

In Example 12, the subject matter of Examples 1-11 can optionally include the magnetized outer structure is an axially-magnetized structure and the magnetized inner structure is an axially-magnetized structure.

Example 13 is a method comprising using a magnetized outer structure and a magnetized inner structure, wherein the magnetized outer and inner structures are axially aligned, providing a first amount of radially-extending flux from the magnetized outer structure of a magnetic switch, and rotating at least one of the magnetized inner and outer structures relative to the other one of the magnetized inner and outer structure to provide a different second amount of radially-extending flux from the magnetized outer structure. In Example 13, the rotation is about an axis of rotation that is common to the magnetized outer structure and magnetized inner structure.

In Example 14, the subject matter of Example 13 can optionally include using a first pole piece, shunting flux across top faces of the magnetized outer and inner structures, and using a second pole piece, shunting flux across bottom faces of the magnetized outer and inner structures.

In Example 15, the subject matter of Example 14 can optionally include shunting the flux across the top and bottom faces including shunting substantially all flux from the magnetized outer and inner structures when the magnetic switch is in an off state corresponding to a minimum amount of flux extending radially from the magnetized outer structure.

In Example 16, the subject matter of Examples 13-15 can optionally include, at a first rotational orientation of the magnetized outer and inner structures, providing substantially zero flux radially away from the magnetized outer structure, and at a second rotational orientation of the magnetized outer and inner structures, providing a non-zero amount of flux radially away from the magnetized outer structure.

In Example 17, the subject matter of Example 16 includes the first and second orientations being 180 degrees apart.

In Example 18, the subject matter of Examples 13-17 can optionally include the magnetized outer structure comprises at least two magnetic regions having respective opposite polarities, and the magnetized inner structure comprises at least two magnetic polarity regions having respective opposite polarities.

In Example 19, the subject matter of Examples 13-18 can optionally include the magnetized outer structure comprises n magnetic polarity regions, and the magnetized inner structure comprises n magnetic polarity regions.

Example 20 is a magnetic switch configured to provide a variable radial flux pattern, the magnetic switch comprising a magnetized outer ring structure, a magnetized inner disc structure, and pole pieces provided on top and bottom faces of the magnetized outer ring and inner disc structures. In Example 20, at least one of the magnetized inner disc and outer ring structures is rotatable relative to the other structure about a common axis of rotation, and the variable radial flux pattern extends away from the common axis of rotation and varies in strength according to a relative position of the magnetized inner disc and outer ring structures. Each of the magnetized outer ring structure and the inner disc structure comprises multiple different polarity regions.

Example 21 is a system to implement of any of Examples 1-20.

Each of these non-limiting Examples can stand on its own, or can be combined in various permutations or combinations with one or more of the other Examples or features discussed elsewhere herein.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein. For example, various examples herein include magnetic switches or structures with matched pairs of pole pieces. Other examples can include switches or structures with only one pole piece.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. In the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A magnetic switch having a variable radial flux pattern, the magnetic switch comprising:

a magnetized outer structure; and a magnetized inner structure provided at least partially inside of the magnetized outer structure;

wherein at least one of the magnetized inner and outer structures is rotatable relative to the other one of the magnetized inner and outer structures about an axis of rotation that is common to the magnetized outer structure and magnetized inner structure, and wherein the variable radial flux pattern extends away from the common axis of rotation and varies in strength according to a relative position of the magnetized inner and outer structures.

2. The magnetic switch of claim 1, wherein:

in a first orientation of the magnetized outer and inner structures, substantially zero radial flux extends radially away from the magnetized outer structure; and in a second orientation of the magnetized outer and inner structures, a non-zero amount of radial flux extends radially away from the magnetized outer structure.

3. The magnetic switch of claim 2, wherein the first and second orientations are 180° apart.

4. The magnetic switch of claim 1, further comprising a first pole piece provided on a top face of the magnetized outer structure and magnetized inner structure and a second pole piece provided on a bottom face of the magnetized outer structure and magnetized inner structure, wherein the first and second pole pieces are configured to shunt substantially all of the flux from the magnetized outer and inner structures when the magnetic switch is in an off state.

5. The magnetic switch of claim 1, wherein at least one of the magnetized outer and inner structures comprises a printed magnet structure, an assembled magnet structure, or a conventional fixture-magnetized magnet structure.

6. The magnetic switch of claim 1, wherein the magnetized outer structure comprises at least two magnetic polarity regions, and wherein the magnetized inner structure comprises at least two magnetic polarity regions.

7. The magnetic switch of claim 6, wherein the magnetized outer structure comprises n magnetic polarity regions, and wherein the magnetized inner structure comprises n magnetic polarity regions, wherein n is greater than two.

8. The magnetic switch of claim 1, wherein the magnetized outer structure comprises a ring-shaped magnetic structure comprising at least one pair of different polarity regions, and wherein the magnetized inner structure comprises a ring-shaped magnetic structure comprising at least one pair of different polarity regions.

9. The magnetic switch of claim 1, wherein the magnetized outer structure comprises a ring-shaped magnetic structure comprising at least one pair of different polarity regions, and wherein the magnetized inner structure comprises a disc-shaped magnetic structure comprising at least one pair of different polarity regions.

10. The magnetic switch of claim 8, further comprising an air gap between the magnetized inner and outer structures.

11. The magnetic switch of claim 1, wherein the magnetized inner structure comprises at least one pair of different polarity regions, wherein the magnetized outer structure is configured to substantially surround an outer side edge of the magnetized inner structure, and wherein the magnetized outer structure comprises at least one pair of different polarity regions.

12. The magnetic switch of claim 1, wherein the magnetized outer structure is an axially-magnetized structure and wherein the magnetized inner structure is an axially-magnetized structure.

13. A method comprising:

using a magnetized outer structure and a magnetized inner structure, wherein the magnetized outer and inner structures are axially aligned, providing a first amount of radially-extending flux from the magnetized outer structure of a magnetic switch;

rotating at least one of the magnetized inner and outer structures relative to the other one of the magnetized inner and outer structure to provide a different second amount of radially-extending flux from the magnetized outer structure, wherein the rotation is about an axis of rotation that is common to the magnetized outer structure and magnetized inner structure.

14. The method of claim 13, comprising:

using a first pole piece, shunting flux across top faces of the magnetized outer and inner structures; and using a second pole piece, shunting flux across bottom faces of the magnetized outer and inner structures.

15. The method of claim 14, wherein shunting the flux across the top and bottom faces includes shunting substantially all flux from the magnetized outer and inner structures when the magnetic switch is in an off state corresponding to a minimum amount of flux extending radially from the magnetized outer structure.

16. The method of claim 13, further comprising:

at a first rotational orientation of the magnetized outer and inner structures, providing substantially zero flux radially away from the magnetized outer structure; and at a second rotational orientation of the magnetized outer and inner structures, providing a non-zero amount of flux radially away from the magnetized outer structure.

17. The method of claim 16, wherein the first and second orientations are 180° apart.

18. The method of claim 13, wherein the magnetized outer structure comprises at least two magnetic regions having respective opposite polarities, and wherein the magnetized inner structure comprises at least two magnetic polarity regions having respective opposite polarities.

19. The method of claim 13, wherein the magnetized outer structure comprises n magnetic polarity regions, and wherein the magnetized inner structure comprises n magnetic polarity regions.

20. A magnetic switch configured to provide a variable radial flux pattern, the magnetic switch comprising:

a magnetized outer ring structure;

a magnetized inner disc structure; and pole pieces provided on top and bottom faces of the magnetized outer ring and inner disc structures;

wherein at least one of the magnetized inner disc and outer ring structures is rotatable relative to the other structure about a common axis of rotation, and wherein the variable radial flux pattern extends away from the common axis of rotation and varies in strength according to a relative position of the magnetized inner disc and outer ring structures; and wherein each of the magnetized outer ring structure and the inner disc structure comprises multiple different polarity regions.

* * * * *